(12) United States Patent
Maddan

(10) Patent No.: US 6,267,854 B1
(45) Date of Patent: Jul. 31, 2001

(54) APPARATUS AND METHOD FOR PRODUCING MAGNESIUM FROM SEAWATER

(76) Inventor: Orville Lee Maddan, 1941 Bishop Rd., Ft. Walton Beach, FL (US) 32547

(*) Notice: Subject to any disclaimer, the term of this patent is extended or adjusted under 35 U.S.C. 154(b) by 0 days.

(21) Appl. No.: 09/422,904

(22) Filed: Oct. 21, 1999

(51) Int. Cl.[7] ................................................. C25B 9/00
(52) U.S. Cl. .......................... 204/258; 204/252; 204/253; 204/257
(58) Field of Search ...................... 204/252, 253, 204/257, 258, 263, 264, 265, 266, 262; 205/746, 747, 748, 749, 620, 508

(56) References Cited

U.S. PATENT DOCUMENTS

| | | |
|---|---|---|
| 3,250,691 | 5/1966 | Broun, Jr. et al. ............. 204/98 |
| 3,755,114 | 8/1973 | Tarjanyi et al. ............. 204/114 |
| 4,483,753 | 11/1984 | Zabelin et al. . |
| 4,804,523 | 2/1989 | Abrams et al. . |
| 4,839,003 | 6/1989 | Dworak et al. ............. 204/98 |
| 4,909,913 | 3/1990 | Fukuda et al. ............. 204/105 R |
| 5,124,012 | 6/1992 | Berleyev ............. 204/180.1 |
| 5,324,396 | 6/1994 | Ferron et al. ............. 204/105 R |
| 5,569,370 | 10/1996 | Gomez ............. 205/560 |
| 5,575,901 | * 11/1996 | Hulme et al. ............. 205/508 |
| 5,814,224 | 9/1998 | Khamizov et al. ............. 210/638 |

* cited by examiner

Primary Examiner—Bruce F. Bell
(74) Attorney, Agent, or Firm—Baker, Donelson, Bearman & Caldwell, L.L.P.

(57) ABSTRACT

A system for producing elemental magnesium (Mg) from seawater having a cell with a pair of permeable membranes which define an anodic compartment with an anode therein and a cathodic compartment with a cathode therein. A space is provided between the pair of membranes through which seawater is allowed to freely flow. A source of electric current is connected to the anode and cathode to charge the compartments in order to cause ions within the seawater to pass from the space into the compartments whereby positive and negative ions are separated. The electric charge associated with the cathode causes the seawater to decompose into $H_2$ and $(OH—)_2$ and positively charged magnesium ions within the seawater pass through the cathodic permeable membrane to combine with the $(OH—)_2$ to form magnesium hydroxide precipitates.

13 Claims, 5 Drawing Sheets

APPARATUS AND METHOD FOR PRODUCING MAGNESIUM FROM SEAWATER

BACKGROUND OF THE INVENTION

1. Field of the Invention

This invention pertains to a system and method for the extraction of magnesium, fresh water, chlorine and hydrogen from seawater, brines, salinated waters or other waste streams.

2. General Background

The production of magnesium from seawater, or other types of salinated water, is currently inefficient and environmentally unsound. Some attempts to produce magnesium from seawater include the use of open systems which heat a slurry until oxidation reduces it to its elemental components. Some such systems and methods are described as follows.

U.S. Pat. No. 5,124,012 issued to G. Berleyev, of Germany, on the application of F. Vomberg, discloses a process for the desalination of seawater by separating ions (Mg++, etc.) contained therein into two (2) separate solutions. At Column 5 thereof are chemical equations illustrating the production of magnesium hydroxide ($Mg(OH)_2$) and hydrogen gas ($H_2$) from magnesium (Mg) and water ($H_2O$). But here, the slurry of calcium and magnesium is heated in an open system until oxidation occurs and then reduced to elemental materials with a hydrogen reducing flame.

U.S. Pat. No. 3,250,691 issued to T. T. Broun, Jr., et al., discloses an apparatus and process for, the electrolysis of an aqueous brine or alkali metal chlorine solution wherein separate tanks created by a diaphragm or permionic membrane have an electrical current provided to a platinum-coated anode in one tank and a platinum and steel cathode in the other tank to separate positive and negative ions in the separate tanks. The current is constant and the voltage across the cell serves to drive the process.

U.S. Pat. No. 3,755,114 issued to Hooker Chemical Corporation of New York, on the application of M. Tarjanyi, et al., discloses an apparatus and process for decreasing the metallic content of a solution wherein an electrolytic cell containing an electrolyte pumped therethrough has a positive electrode or anode and a negative electrode or cathode separated by a diaphragm or screen and an electrical current provided to the anode and cathode to separate positive and negative ions across the diaphragm. The screens prevent the discharge of particles through the outlet.

U.S. Pat. No. 5,569,370 issued to RMG Services Pty. Ltd., of Australia, on the application of R.A. Gomez, discloses a system for the recovery of metals from metal ores wherein the reactions are carried out in separate tanks, a first tank having anodes therein and a second tank having cathodes therein, the tanks being created by an electrically conductive wall. Power is provided to the anodes and cathodes to separate positive and negative ions in the separate tanks.

U.S. Pat. No. 4,909,913 issued to Toyo Soda Manufacturing Co, Ltd., of Japan, on the application of K. Fukuda, et al., discloses, an apparatus and method for producing a metal salt by electrolysis in an electrolytic cell having separate compartments created by a diaphragm or membrane. An electrical current provided by source to the anode in one compartment and the cathode in the other compartment drives separate positive and negative ions into the separate compartments.

U.S. Pat. No. 4,804,523 issued to Bechtel Group, Incorporated, of California, on the application of J. Z. Abrams, et al., discloses a method for removing sulfur dioxide ($SO^2$) from a flue gas in fossil fuel power plants wherein seawater is used as the source of magnesium (Mg) to produce magnesium hydroxide ($Mg(OH)_2$) absorbent by reaction with hydrated lime.

U.S. Pat. No. 5,814,224 issued to Institute Geokhimii, of Moscow, on the application of R. Khamizov, et al., discloses a method for the desalination of seawater including magnesium separation by producing concentrated magnesium carbonate ($MgCO_3$).

U.S. Pat. No. 4,483,753 issued to Vsesojuzny Institute, of the former USSR, on the application of I. V. Zabelin, et al., discloses a method of continuously extracting magnesium (Mg) from magnesium chloride ($MgCl_2$) in a multiple cell flow apparatus.

While the previously disclose attempts at a precipitator comprising a container having a membrane or baffle which creates anodic and cathodic compartments and has a source of electrical current to charge the compartments so as to allow an electrolyte or aqueous brine solution to pass and the ions to be separated; and, further provide means to remove hydrogen and chlorine gases from the solution; and, still further a method using seawater as the source of magnesium (Mg) to produce magnesium hydroxide ($Mg(OH)_2$) precipitates and, still further separating ions (Mg++, etc.) contained in seawater by producing magnesium hydroxide ($Mg(OH)_2$) and hydrogen gas ($H_2$) from magnesium (Mg) and water ($H_2O$) and magnesium (Mg) and water ($H_2O$) from magnesium oxide (MgO) and hydrogen gas ($H_2$), none of these prior art patents teach applicants system for producing elemental magnesium (Mg) from seawater comprising: a cell having compartments separated by a pair of permeable membranes which create anodic and cathodic compartments, the anodic compartment having an anode therein and the cathodic compartment having an cathode therein; a space provided between the pair of membranes through which seawater is allowed to freely flow; a source of electric current connected to the anode and cathode to charge the compartments so as to allow seawater to pass from the space between and through the membranes and into said compartments whereby positive and negative ions are separated; means for collecting magnesium hydroxide ($Mg(OH)_2$) precipitate in the cathodic compartment; means for removing the collected magnesium hydroxide ($Mg(OH)_2$) precipitate from the cathodic compartment to means for reducing the collected magnesium hydroxide ($Mg(OH)_2$) to elemental magnesium (Mg) and water vapor, the reduction being effected by introducing hydrogen gas into the means for reducing wherein it contacts the collected magnesium hydroxide ($Mg(OH)_2$) precipitate. Still further none of these prior art patents teach applicant's method for producing magnesium hydroxide ($Mg(OH)_2$) precipitate and pure water from seawater comprising: providing a cell having compartments separated by a pair of permeable membranes which create anodic and cathodic compartments; providing a space provided between the pair of membranes through which seawater is allowed; to freely flow; passing electrical current through the Cell so as to allow seawater to pass from the space and through the membranes and into the compartments whereby positive and negative ions are separated; collecting magnesium hydroxide ($Mg(OH)_2$) precipitate that forms in the cathodic compartment; passing the magnesium hydroxide ($Mg(OH)_2$) precipitate to a magnesium reducer wherein it reacts with hydrogen ($H_2$) gas to produce elemental magnesium (Mg) and water vapor.

Accordingly, it is seen that a need remains for a system and method for producing magnesium from sea water in an efficient manner. It is to the provision of such therefore that the present invention is primarily directed.

SUMMARY OF THE PRESENT INVENTION

The preferred embodiment of the system and method of the present invention solves the aforementioned problems in a straightforward and efficient manner. What is provided is a system for producing elemental magnesium (Mg) from seawater comprising: a cell having compartments separated by a pair of ion permeable membranes which create anodic and cathodic compartments, the anodic compartment having an anode therein and the cathodic compartment having an cathode therein; a space provided between the pair of membranes through which seawater is allowed to freely flow; a source of electric current connected to the anode and cathode to charge the compartments so as to allow seawater to pass from the space between and through the membranes and into said compartments whereby positive and negative ions are separated; means for collecting magnesium hydroxide ($Mg(OH)_2$) precipitate in the cathodic compartment; and, means for removing the collected magnesium hydroxide ($Mg(OH)_2$) precipitate from the cathodic compartment to means for reducing the collected magnesium hydroxide ($Mg(OH)_2$) to elemental magnesium (Mg) and water vapor, the reduction being effected by introducing hydrogen gas into the means for reducing wherein it contacts the collected magnesium hydroxide ($Mg(OH)_2$) precipitate. Also provided is a method for producing magnesium hydroxide ($Mg(OH)_2$) precipitate and pure water from seawater comprising: providing a cell having compartments separated by a pair of permeable membranes which create anodic and cathodic compartments; providing a space provided between the pair of membranes through which seawater is allowed to freely flow; passing electrical current through the cell so as to allow seawater to pass from the space and through the membranes and into the compartments whereby positive and negative ions are separated; collecting magnesium hydroxide ($Mg(OH)_2$) precipitate that forms in the cathodic compartment; and, passing the magnesium hydroxide ($Mg(OH)_2$) precipitate to a magnesium reducer wherein it reacts with hydrogen ($H_2$) gas to produce elemental magnesium (Mg) and water vapor.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
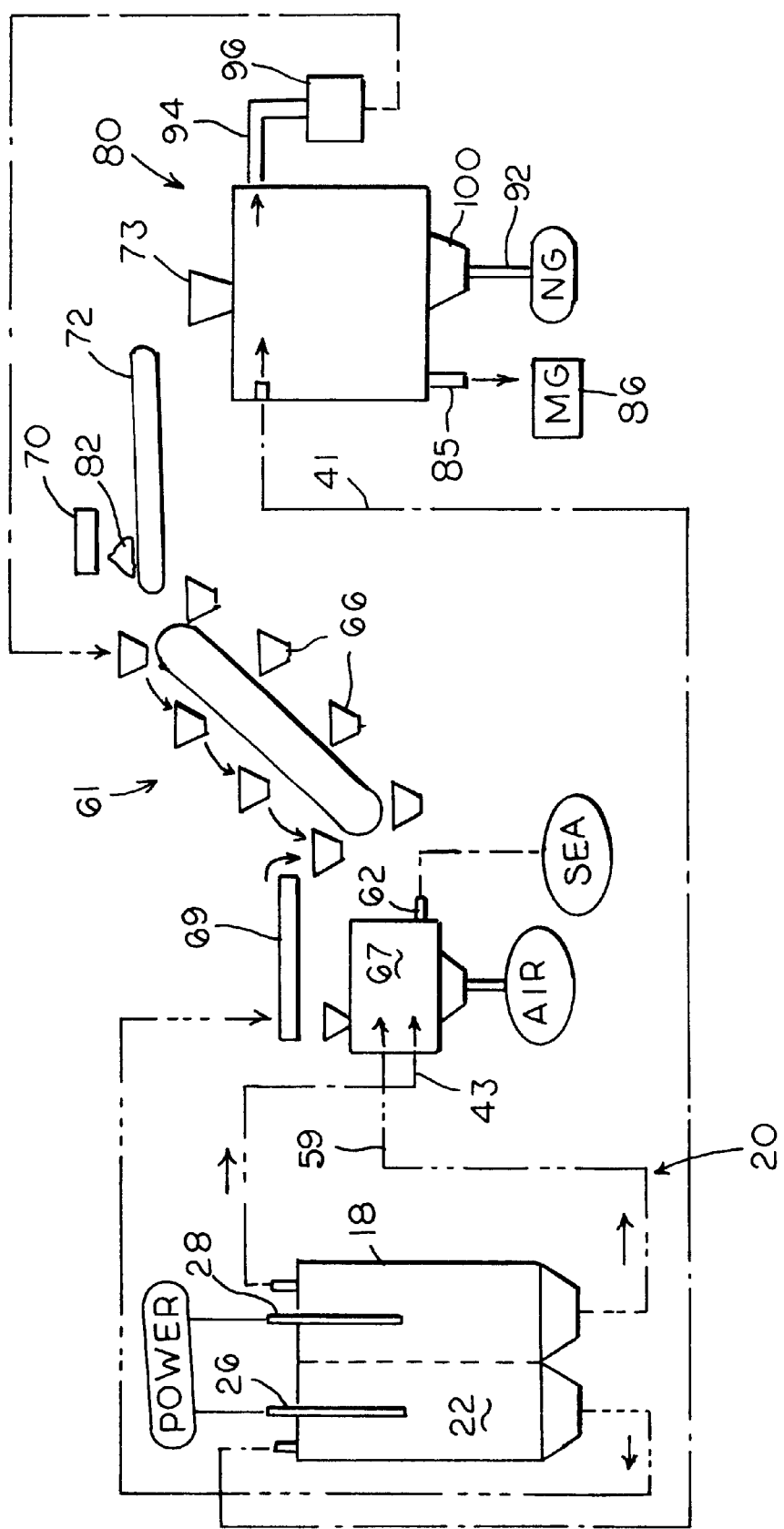
FIG. 1 is a schematic illustrating the method and system of the present invention.
Figure 2:
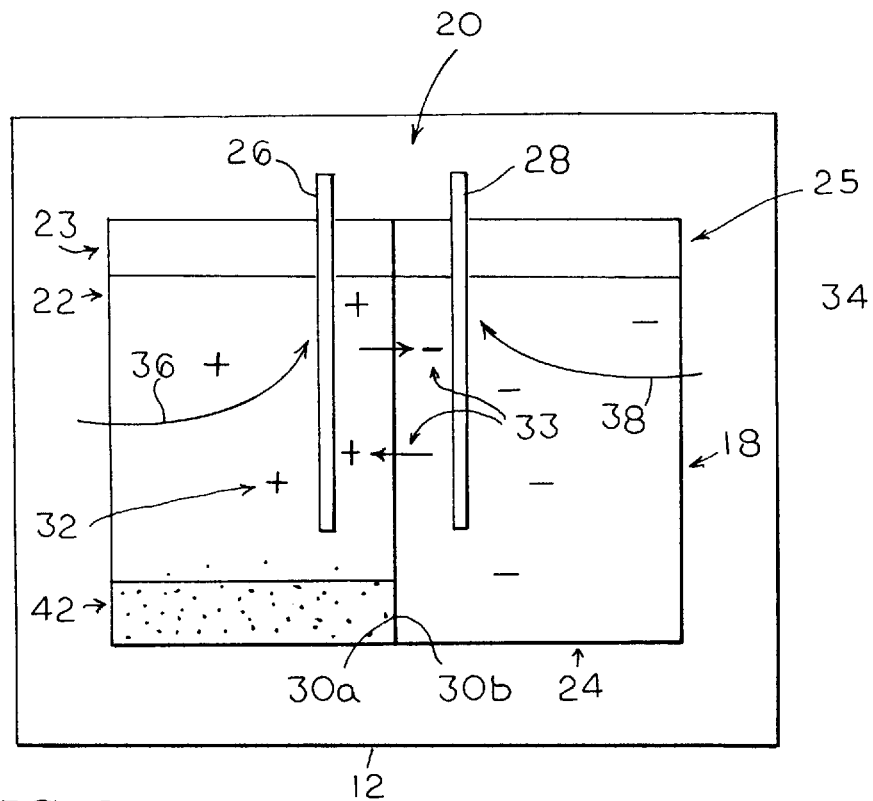
FIG. 2 is a cross-section of a basic precipitator illustrating the primary reaction of the method of the present invention at the cathode which allows separation of solid $Mg(OH)_2$ from the cathodic supernate.

Referring to the drawings, the system 10 of the present invention is schematically illustrated. Seawater is provided in a source 12 of raw material which may be provided by the open sea or a large containing area such as a tank.

The system includes a precipitator 20 having a housing 18 divided into a cathodic compartment 22 having a cathode 26 therein, preferably made of stainless steel, and an anodic compartment 24 having an anode 28 therein, preferably made of carbon. Cathodic compartment 22 and anodic compartment 24 are separated by a common wall having ion permeable membranes 30a, 30b. Such ion permeable membranes are discussed in detail in U.S. Pat. Nos. 3,755,114; 4,909,913 and 4,804,523, which are specifically incorporated herein. Membrane 30a is designated the cathodic ion permeable membrane while membrane 30b is designated an anodic ion permeable membrane. Housing 18 can be opened or closed, but by closing it fresh water can be captured as will be described further herein. Providing conventional electrical current, in the preferred range of between 2.5 volts and 12 volts, to the cathode 26 (negative) and anode 28 (positive) produces ion drift indicated by arrows 33 such that the positive ions 32 migrate through cathodic ion permeable membrane 30a toward cathode 26 while the negative ions 34 migrated through anodic ion permeable membrane 30b toward anode 28. The voltage may be used as a throttle for the speed of action and reaction. The ion drift creates OH—molecules in the cathodic compartment 22. The cathodic cell is fully charged when the majority of the anions are removed from compartment 22.

The primary reaction at cathode 26 decomposes water $2H_2O$ (g) into hydrogen $H_2$ (g) and $(OH—)_2$ (aq). The OH— ions move from cathode 26 toward anode 28 wherein they combine with the first positive ion encountered. Hydrogen gas is produced at cathode 26 which migrates in compartment 22, in the direction of arrow 36, to hydrogen gas compartment 23, in the upper portion of compartment 22. The hydrogen gas compartment 23 has a vent 21.

The production of hydrogen gas and the increase of OH— ions continues until all Mg ions are depleted. Since the Mg++ ions have a greater ionic attraction than does the other ions within the seawater, such as Na+, K+ or the Ca++ ions, the Mg++(aq) will combine with or take OH—(aq) away from the other compounds that have formed so as to form magnesium hydroxide. Magnesium hydroxide ($Mg(OH)_2$) precipitates 42 within the seawater and settles in the lower portion of compartment 22 as a solid, as it is not soluble in seawater at the ambient temperatures.

Within anodic compartment 24 the chemical reaction of the inputed elements reduces species such as chlorine gas depending on the species in solution which migrates, in a direction indicated by arrow 38, to chlorine gas compartment 25 located in the upper portion of compartment 24. Chlorine gas compartment 25 has a vent 31.

Magnesium hydroxide ($Mg(OH)_2$) 42 is pumped out of cathodic compartment 22 at outlet 27 and into pipe line 47. Pipe line 47 delivers the collected $Mg(OH)_2$ precipitates and the accompanying cathodic supernate to stage 50 for purification, as discussed in more detail hereinafter.

Figure 3:
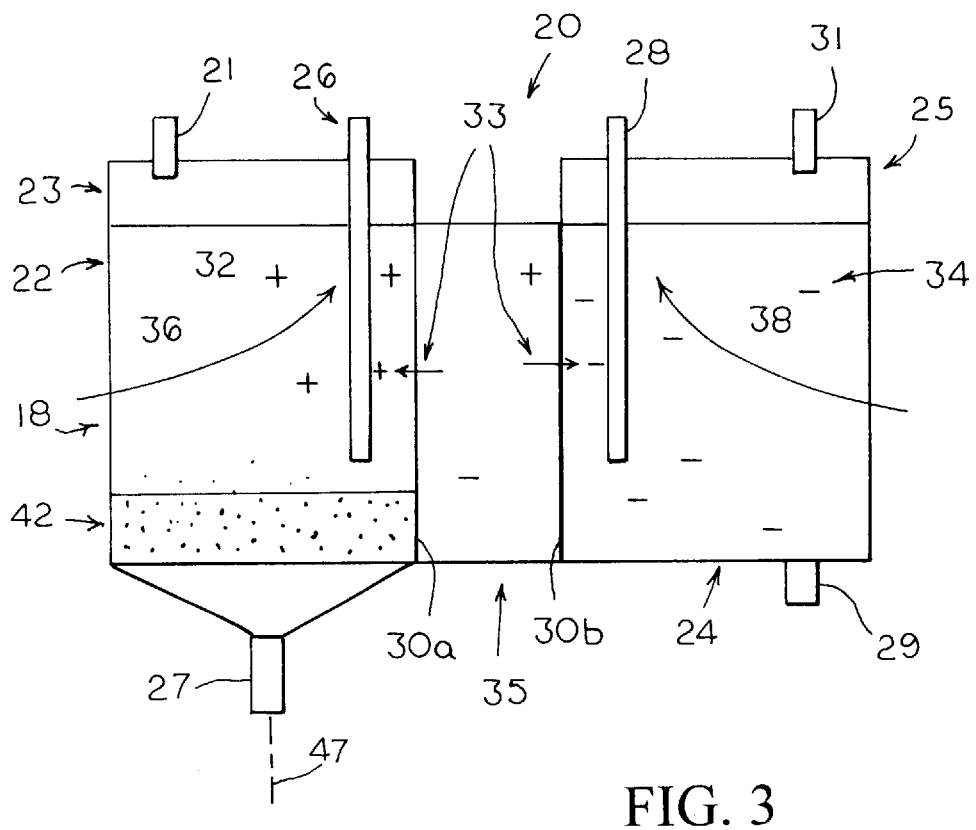
FIG. 3 is a side view in cross section of the precipitator of the present invention.
Figures 4A, 4B:
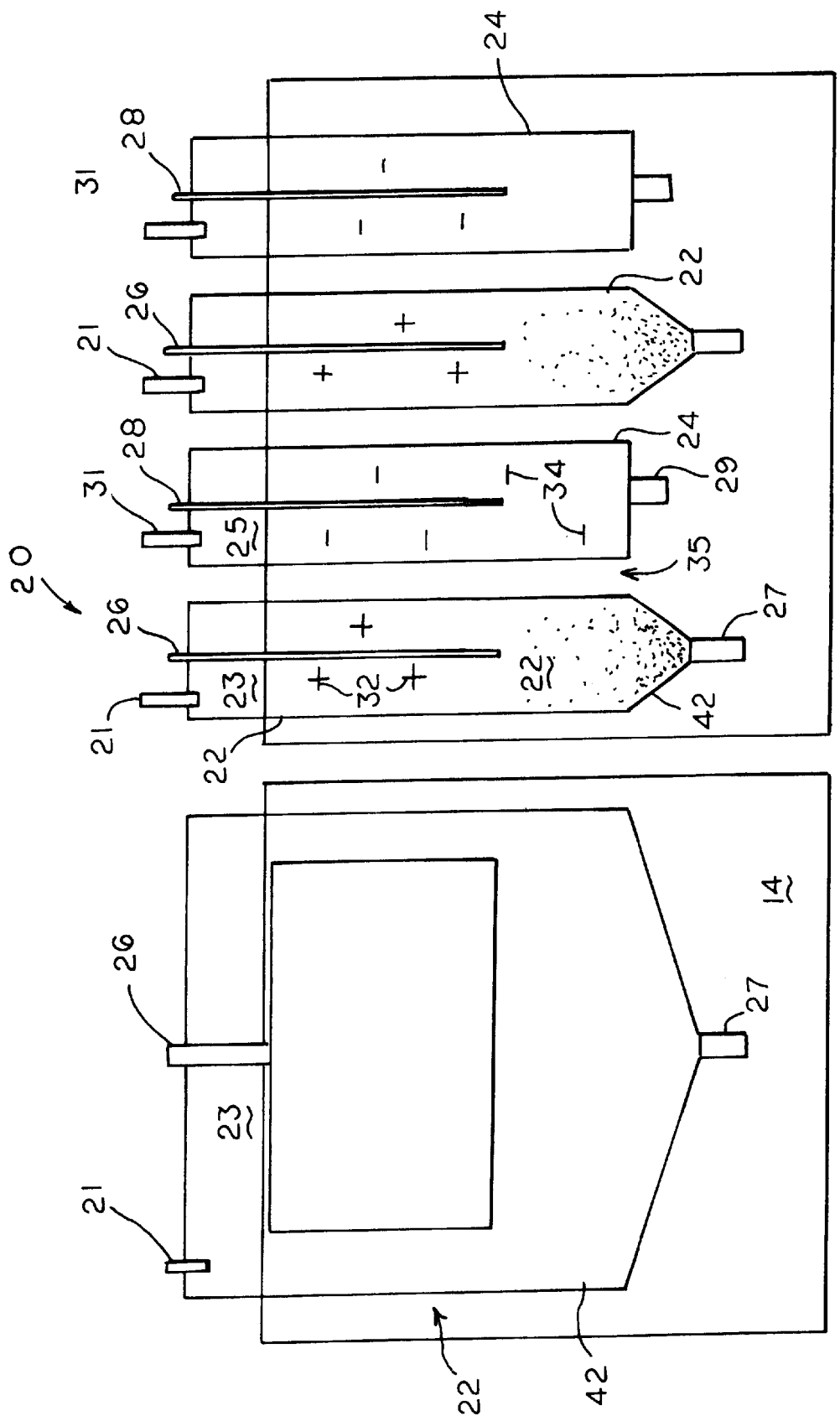
FIG. 4A is an end view in cross section of the precipitator of FIG. 3.
FIG. 4B is a side view of the precipitator of FIG. 4A.

In an alternative embodiment, shown in FIGS. 3 and 4, it can be seen that precipitator 20 has a series of alternating or staggered cathodic and anodic compartments 22, 24. Here, the cathodic and anodic membranes are separated from each other to form a space or area 35 therebetween through which a flow of sea water passes, which allows production of magnesium hydroxide (Mg(OH)$_2$) 42 in the several compartments 22 as previously discussed. As illustrated in FIG. 4, tank 18 may contain such series of cathodic and anodic compartments 22, 24 in any orientation, as long as seawater 14 flows through areas 35 to allow ion drift described. The greater the length of compartments 22, 24, and therefore the greater the length of flow through area or space 35, the greater the collection of magnesium hydroxide (Mg(OH)$_2$) 42 in the several compartments 22.

Figure 5:
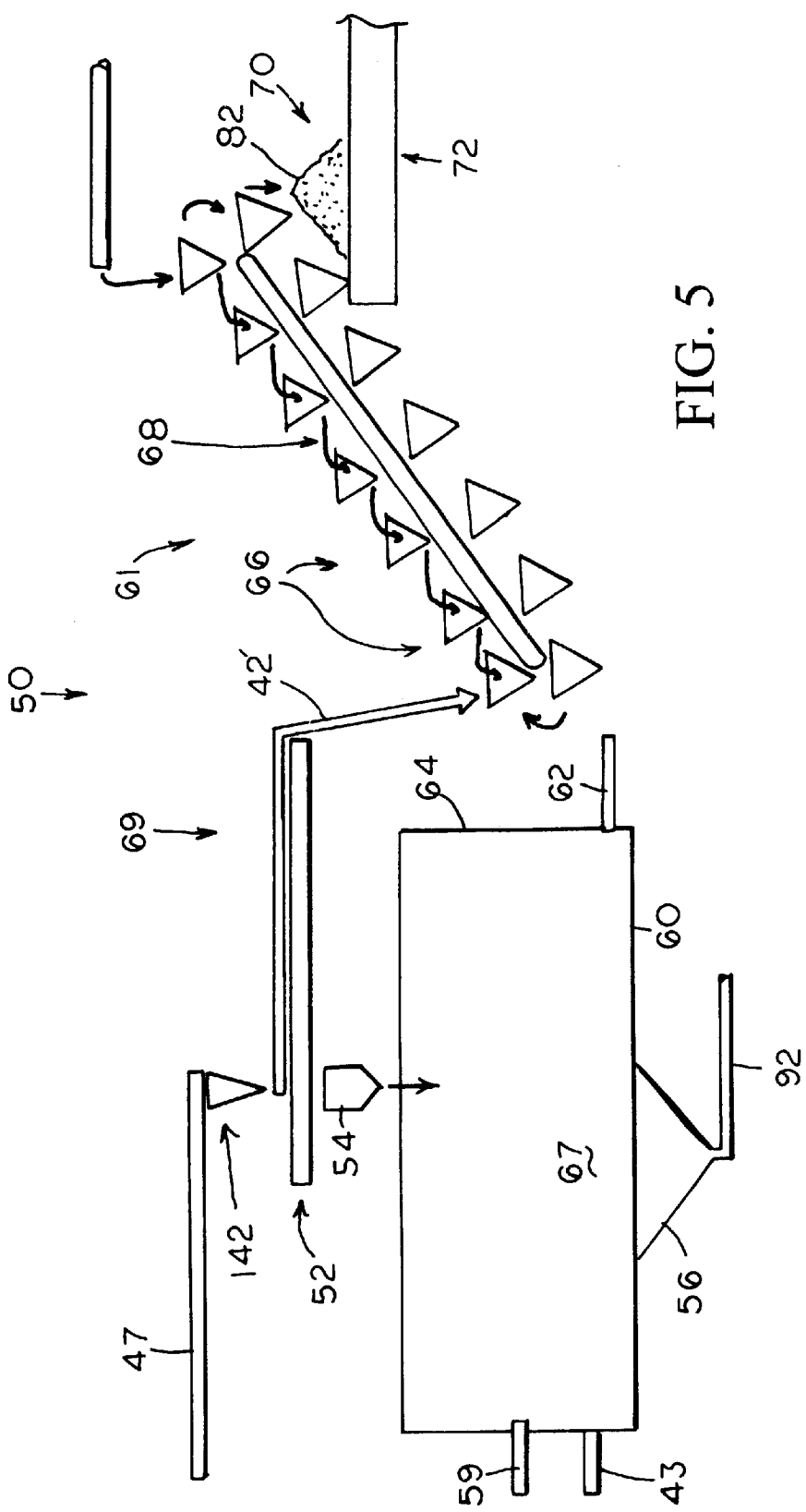
FIG. 5 is a schematic illustrating the magnesium collection, recombination and balancing steps of the method of the present invention.

Referring next to FIG. 5, at stage 50 the collected magnesium hydroxide (Mg(OH)$_2$) 42' and cathodic supernate (collectively designated as specimen 142') is deposited upon a filter 52. The Mg(OH)$_2$ 42' is filtered from the cathodic supernate by filter 52 and transported by belt 69 to a belt type washer 61. The washer 61 has an inclined, endless loop of washing tanks 66. As the magnesium hydroxide is poured into the lower most tank 66 water obtained through a process discussed hereinafter, is poured into the uppermost tank 66. This water flows in sequence through all the tanks as they move upwardly, as indicated by the arrows in FIG. 5. The washed magnesium hydroxide is then dumped from the uppermost tank 66 onto a belt 72. The belt 72 is driven past a dryer 70 which heats the magnesium hydroxide so as to remove the residual water. The dried magnesium hydroxide is transported by belt 72 to magnesium reducer 80.

Simultaneously, the cathodic supernate passes through filter 52 into collector funnel 54 which then conveys the supernate to blending tank 60. The cathodic supernate mixes in tank 60 with anode supernate delivered thereto from anodic compartments 24 through outlets 29 and pipe lines 59. Chlorine gas vented from chlorine gas compartment 25 is also delivered to tank 60 through pipe line 43.

Within blending tank 60 all of the tailings from the various processes are combined and balanced to the consistency of seawater. To this end air is pumped into the tank 60 through inlet 56 so as to bring the mixture to the consistency of seawater with a slightly higher salinity level and with less magnesium. This clean mixture 67 is removed at outlet 62 in tank 60 and returned to the source of origination.

Figure 6:
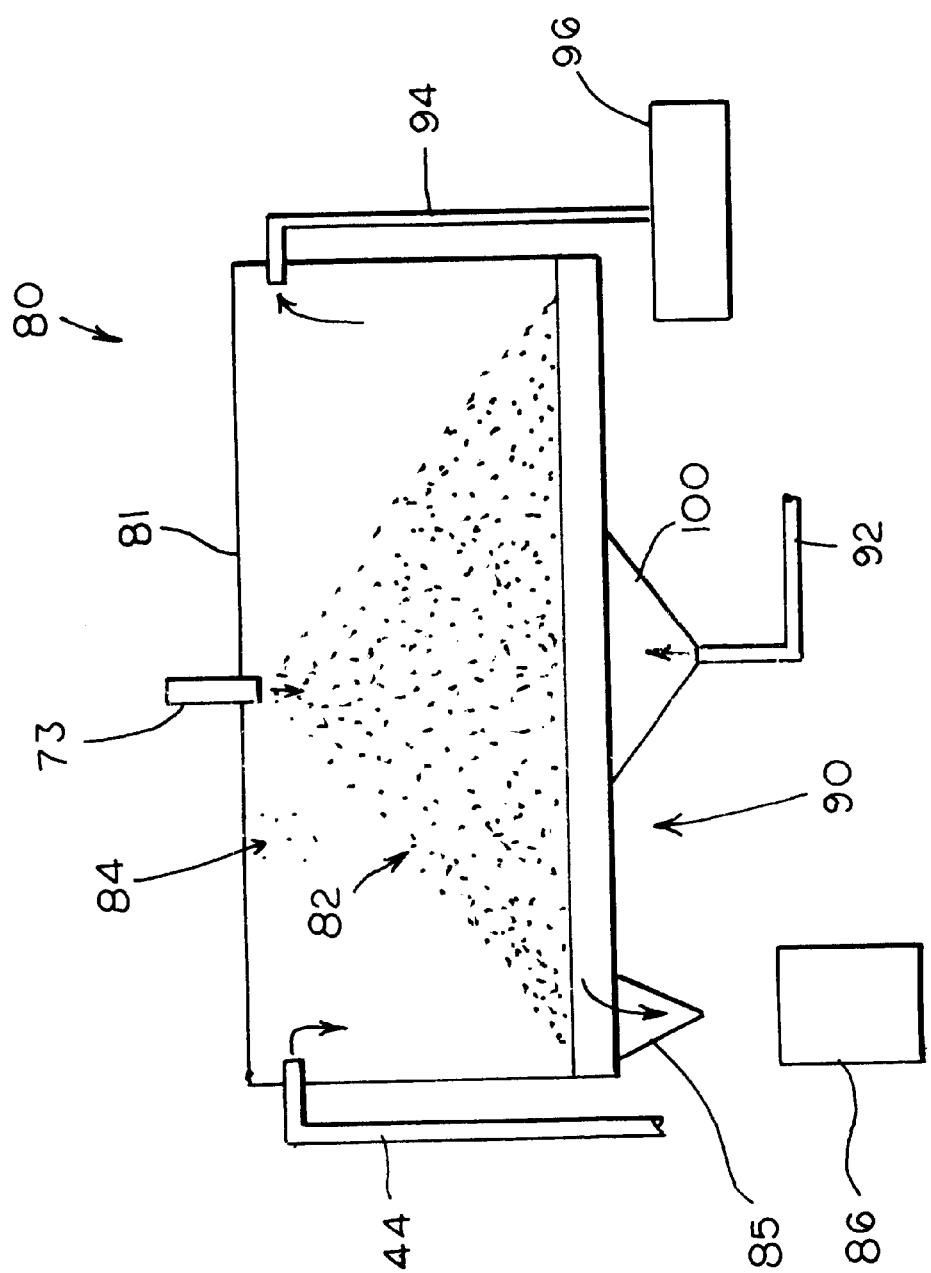
FIG. 6 is a schematic illustrating the magnesium reduction step of the method of the present invention.

Referring now to FIG. 6, magnesium reducer 80 has a tank 81 having an inlet 73 communicating with feed belt 72 so that tank 81 receives the filtered and washed magnesium hydroxide (Mg(OH)$_2$) 82 therein. Hydrogen gas, or other reducing gases, are fed into tank 81 from hydrogen compartment 23 via vent 21 and pipe line 41 at a metered rate to control the speed of the reaction, as discussed further herein. Natural gas is fed into an ignited fire chamber 100 via line 92, from an unshown source of natural gas, to heat the interior of reducer tank 81 to approximately 675° C. Within tank 81 the hydrogen gas from line 41 reduces the filtered and washed magnesium hydroxide (Mg(OH)$_2$) 82 to molten magnesium (Mg) and water vapor 84 by the following reaction:

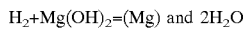

$$H_2 + Mg(OH)_2 = (Mg) \text{ and } 2H_2O$$

The molten magnesium (Mg) is removed through outlet 85 so that it can be made and cooled into finished ingots, such as 86. The water vapor 84 resulting from the reduction is removed at outlet 94 and condensed as pure water within collector 96, where it may then be used for the previously described magnesium hydroxide washing process.

It should be understood that the term sea water or salinated water may be sea water, brine, salinated ground water or other similar water or aqueous solutions which contain metal ions. It should also be understood that the apparatus may operate with only a cathodic chamber with the anode positioned adjacent to the membrane to induce ion flow.

It thus is seen that an apparatus for generating magnesium from sea water is now provided. It should of course be understood that many modifications may be made to the specific preferred embodiment described herein without departure from the spirit and scope of the invention as set forth in the following claims.

What is claimed is:

1. A system for producing elemental magnesium (Mg) from seawater comprising:

(a) a cell having compartments separated by at least a pair of permeable membranes which create anodic and cathodic compartments, said anodic compartment having an anode therein and said cathodic compartment having a cathode therein;

(b) a space provided between said pair of membranes through which the seawater is allowed to freely flow;

(c) a source of electric current connected to said anode and cathode to charge said compartments so that positive ions within the seawater pass through one said membrane and into said cathodic compartment and negative ions within the seawater pass through the other said membrane and into said anodic compartment;

(d) means for collecting magnesium hydroxide (Mg(OH)$_2$) precipitate in said cathodic compartment; and, (e) means for removing said collected magnesium hydroxide (Mg(OH)$_2$) precipitate from said cathodic compartment to means for reducing said collected magnesium hydroxide (Mg(OH)$_2$) to elemental magnesium (Mg) and water vapor, said reduction being effected by introducing hydrogen gas into said means for reducing wherein it contacts said collected magnesium hydroxide (Mg(OH)$_2$) precipitate.

2. The apparatus of claim 1 further comprising means for collecting hydrogen gas produced in said cathodic compartment and discharging said hydrogen gas collected in said cathodic compartment to said reducing means to contact said collected magnesium hydroxide (Mg(OH)$_2$) precipitate.

3. The apparatus of claim 1 further comprising means for collecting and discharging chlorine gas produced in said anodic compartment.

4. An apparatus for producing magnesium from an aqueous solution of a water-soluble metal compound comprising:

a cathodic compartment at least partially defined by a cathodic ion permeable membrane;

a cathode positioned within said cathodic compartment;

an anode positioned adjacent said cathodic compartment;

a source of electric current connected to said cathode and said anode;

a heating chamber;

means for conveying precipitates from said cathodic compartment to said heating chamber;

means for heating the interior space of said heating chamber;

a source of magnesium hydroxide reducing gas;

means for conveying a magnesium hydroxide reducing gas into said heating chamber, and means for conveying reduced magnesium from said heating chamber, whereby with the apparatus cathodic ion permeable membrane in direct contact with a source of aqueous solution the electric charge associated with the cathode causes the aqueous solution to decompose into H$_2$ and (OH—)$_2$, and whereby positively charged magnesium ions within the aqueous solution pass through the cathodic permeable membrane as a result of the electromagnetic attraction associated with the cathode, wherein the magnesium ions will combine with (OH—)$_2$ to form magnesium hydroxide Mg(OH)$_2$ precipitates within the aqueous solution, and whereby the magnesium hydroxide is conveyed to the heating chamber and treated with a reducing gas to create magnesium.

5. The apparatus of claim 4 further comprising an anodic compartment in which is positioned said anode.

6. The apparatus of claim 5 further comprising a blending compartment and means for conveying an anodic supernate created within said anodic compartment to said blending compartment.

7. The apparatus of claim 6 further comprising gas conveying means for conveying gases created within said anodic compartment to said blending compartment.

8. The apparatus of claim 7 further comprising means for conveying a liquid from said blending compartment.

9. The apparatus of claim 5 further comprising an anodic membrane separated from said cathodic membrane by a space therebetween through which the aqueous solution passes.

10. The apparatus of claim 4 wherein said means for conveying precipitates includes a washing tank.

11. The apparatus of claim 10 further comprising water conveying means for conveying water created within said heating chamber to said washing tank.

12. The apparatus of claim 11 wherein said water conveying means includes a water condenser.

13. The apparatus of claim 4 wherein said means for conveying a magnesium hydroxide reducing gas into said heating chamber comprises a conduit extending between said heating chamber and said cathodic compartment.

* * * * *